Jan. 9, 1940.   B. L. OSER   2,186,120
SANITARY MULTIPLE HOUSING FOR SMALL ANIMALS
Filed Sept. 13, 1937
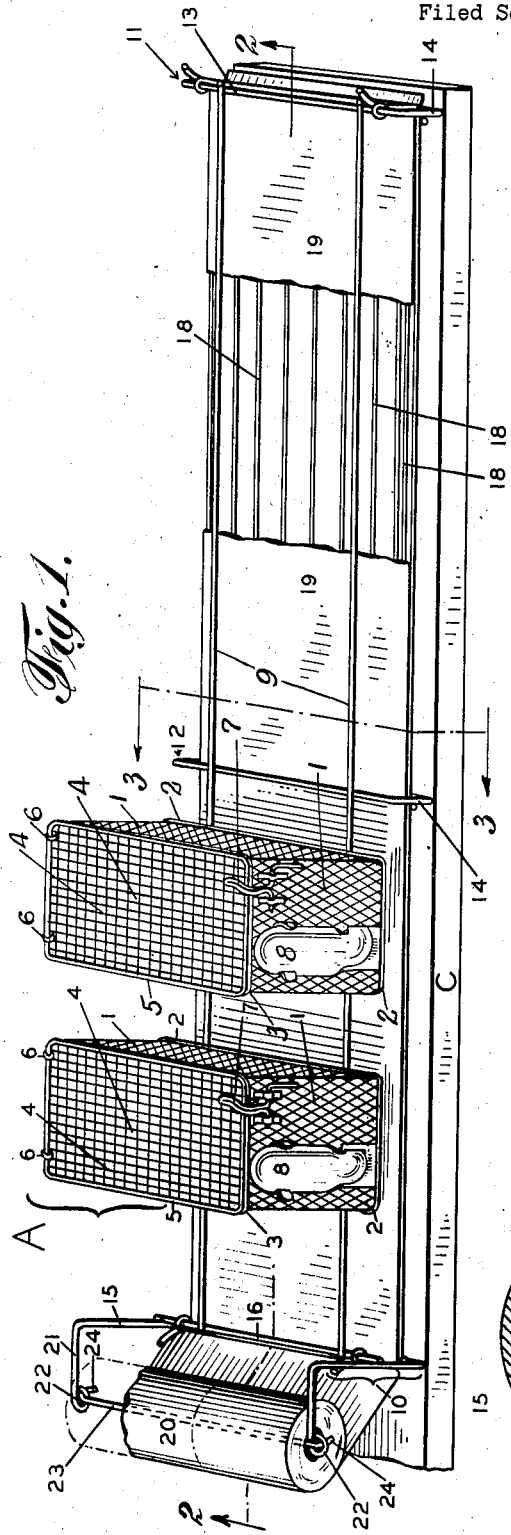
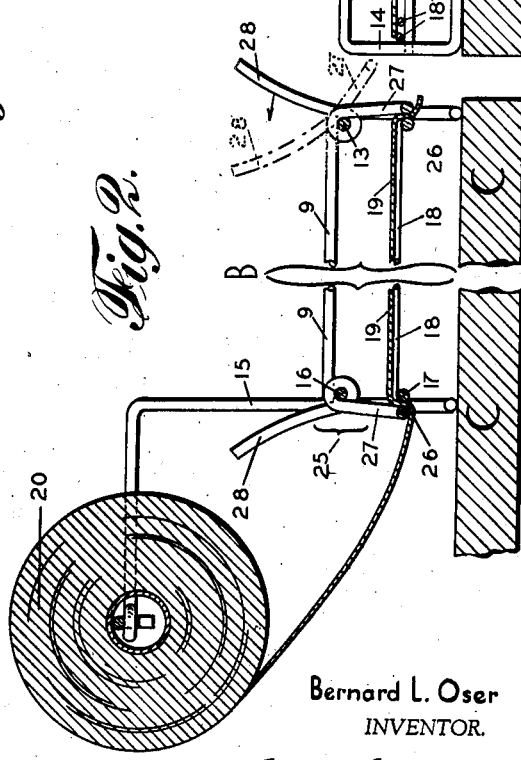
Bernard L. Oser
INVENTOR.
BY *J. J. Nydick*
ATTORNEY.

Patented Jan. 9, 1940

2,186,120

UNITED STATES PATENT OFFICE 2,186,120

SANITARY MULTIPLE HOUSING FOR SMALL ANIMALS

Bernard L. Oser, Forest Hills, N. Y.

Application September 13, 1937, Serial No. 163,599

4 Claims. (Cl. 119—17)

This invention relates to indoor housings for small animals and, in particular, is directed to sanitary multiple caging devices.

Innumerable small animals, such as white mice, white rats, guinea pigs and the liks, are bred and experimented upon in scientific laboratories. In these laboratories and research institutions sanitation is of prime importance, and economy of operation a much sought for objective. Laboratories operating in large cities, especially those occupying quarters commanding high rentals, are sometimes compelled to overcrowd their animal colonies. Under such conditions maintenance costs for labor are high, and withal the animal room may be far from the desired degree of sanitation.

Existing cages are inadequately built for maximum cleanliness. Scattered food and excreta accumulate in the corners and entail much labor in keeping the cages clean. Ingestion of contaminated food residues may affect the experimental animals or disturb the results of the laboratory studies.

Breeders and laboratories have long wanted multiple housing for their animals affording utmost cleanliness coupled with easy and rapid means for disposing of the wastes. These desiderata should be combined with maximum utilization of the space allotted to the animal colonies.

One of the objects of this invention is to provide durable caging of economical construction and improved cleanliness.

Another object of this invention is to increase the number of animals which may be housed within a limited area.

Another object of this invention is to afford swift and easy means for rearranging animal colonies in a laboratory.

Another object of the invention is to provide rapid and easy means of removing and disposing of the animal droppings.

Another object of the invention is to prevent self-contamination of the animals by ingestion of their own droppings.

Other objects and advantages of my invention will appear on inspection of the drawing, in which:

Fig. 1 is a perspective view of a single cage positioned as part of a battery of similar sanitary cages in combination with a cooperating droppings collector. A part of the view is shown broken away and in dotted outline in order better to illustrate the assemblage.

Fig. 2 is a broken section on the line 2—2 of the battery rack looking in the direction of the arrows and illustrating the construction of the rack ends. Dotted lines show clamping means in released position.

Fig. 3 is a section of the rack on the line 3—3 of Fig. 1 looking in the direction of the arrows.

In the drawing like numerals refer to like parts throughout the several views.

In Fig. 1, A represents a sanitary cage in which the numeral 1 represents wire screen of appropriate mesh and requisite sturdiness shaped to form the walls of a cage. The ends of the screening, which form the walls, may be fastened by appropriate means to form an enclosure. A floor is affixed to the wall section at the lower edges 2, 2. The floor is built of screening, the mesh of which depends upon the size of the animals to be housed therein. The floor should be sufficiently sturdy to withstand the weight of the animals in the cage. The upper edge of the wall 1 is furnished with an edging 3. Said edging is preferably made of wire, to which the screening 1 is fastened. A lid 4 is constructed of screening with finished edges 5. Said edges may be made of wire similar to that used in the construction of 3.

The lid 4 is cooperatively connected with the back wall of the cage by means of hinges 6, 6. At the upper righthand corner of the front wall there is a catch 7, which is used to keep the lid 4 securely fastened to the cage. Numeral 8 represents a feed holder for supplying water or other food materials to the animal within the cage.

The rack B rests on a shelf or plank C, or other appropriate support. In my preferred embodiment the rack B is constructed of metal rods. The individual cages A rest upon the rods 9, 9, which are mounted on risers 10, 11 and 12.

Risers 11 and 12 are built of rods fashioned into horizontal portions 13, 13 and the ends thereof are bent at right angles to 13, thereby forming legs 14, 14. Riser 10 is also built of rods by fastening to the legs 15, 15 a horizontal cross bar 16 on which 9, 9 are mounted. To achieve greater rigidity of the rack the lower ends of legs 14 and 15 are turned toward each other.

To the legs 14 and 15 of the risers there are fastened by appropriate means, such as welding, brazing or the like, cross bars 17, as shown in detail in Fig. 3. A plurality of rods 18, 18 are attached to the cross bars 17 by appropriate means, such as welding, brazing or the like and form a bed or platform for supporting a web of absorbent paper 19, which may from time to time be withdrawn from supply roll 20.

The legs 15 of end riser 10 extend upward a sufficient distance so as to form a support by which the roll of paper 20 may be supported. The upper portions of 15, 15 are bent outwardly from the frame and the free ends thereof 21, 21 are shaped in the form of loops 22. A rod 23 carries the roll of paper 20 and is suspended by 22, 22 by inserting therein the vertical ends 24, 24 of rod 23.

The web of paper 19 is kept flat on the bed or platform 18 by means of catches or clamps 25, 25 at points 26, 26. These catches are shown in detail in Fig. 2 and are constructed of wire or other appropriate materials by looping the same around the risers 10 and 11 so as to form a brake portion 27, 27 and a release arm 28, 28.

The distance between the bed or platform 18 supporting the web of paper 19 and the rods 9, 9 is designed so that an animal cannot, by extending its foot through the openings in the floor of the cage, reach the paper 19 and tear it.

As thus constructed, a battery of cages with its animal inhabitants can be maintained in excellent sanitary condition. The cages are well ventilated; the animals' droppings and food fall through the floor thereof onto the absorbent paper 19; when it is desired to remove the soiled paper, the catches 25, 25 are released, as shown in the dotted position of Fig. 2, and the sheet 19 pulled through until a fresh section thereof emerges from the rack.

The withdrawn section of the soiled paper 19 is separated from the web and may readily be disposed of. The fresh section of the paper is fastened to the support platform 18 by the catches 25, 25. It will be observed that the shelf C, upon which the animal colony is housed, is maintained in a fresh and clean condition.

By means of my invention it is possible to quarter eight of my improved cages in the place of five cylindrical cages ordinarily used for the same purpose, thereby housing a greater number of animals in the same space.

I claim:

1. In animal husbandry a sanitary rack for supporting a battery of cages, comprising in combination: a pair of rods mounted on risers, a platform beneath said rods for retaining a web of material to catch the droppings from the cages, clamping means for keeping the web stationary, and a pair of rods extending upwardly from one of the end risers for supporting a supply roll of the aforesaid web material.

2. In animal husbandry a sanitary rack for supporting a battery of cages, comprising in combination: a pair of rods mounted on risers, a platform beneath said rods for retaining a web of material to catch the droppings from the cages, said platform comprising a plurality of rods mounted on crossbars mounted on said risers, clamping means for keeping the web stationary, and a pair of rods extending upwardly from one of the end risers for supporting a supply roll of the aforesaid web material.

3. A sanitary housing for small animals, comprising in combination: a battery of cages with open mesh floors; said cages being supported by means comprising in combination: a pair of rods mounted on risers, a platform beneath said rods for retaining a web of material to catch the droppings from the cages, clamping means for keeping the web stationary, and a pair of rods extending upwardly from one of the end risers for supporting a supply roll of the aforesaid web material.

4. A sanitary housing for small animals, comprising in combination: a battery of cages with open mesh floors; said cages being supported by means comprising in combination: a pair of rods mounted on risers, a platform beneath said rods for retaining a web of material to catch the droppings from the cages, said platform comprising a plurality of rods mounted on crossbars mounted on said risers, clamping means for keeping the web stationary, and a pair of rods extending upwardly from one of the end risers for supporting a supply roll of the aforesaid web material.

BERNARD L. OSER.